United States Patent Office 3,488,721
Patented Jan. 6, 1970

3,488,721
PREPARATION OF A GREASE ADDITIVE CONCENTRATE CONTAINING A WATER-SOLUBLE INORGANIC COMPOUND
Richard L. Frye, Port Arthur, Tex., assignor to Texaco Inc., New York, N.Y., a corporation of Delaware
No Drawing. Filed June 12, 1967, Ser. No. 645,473
Int. Cl. C10m 7/30
U.S. Cl. 252—21
26 Claims

ABSTRACT OF THE DISCLOSURE

This invention relates to the preparation of a stable dispersion of a water soluble compound in an oleaginous medium. More particularly, this invention relates to the incorporation of water soluble compounds in grease compositions by the addition of aforementioned dispersion to a grease. The dispersion is prepared using a low molecular weight polyethylene polymer in admixture with an aqueous solution of the compound with mixing and dehydration. Water-soluble compounds employed in the dispersion are ones having corrosion inhibiting properties, extreme pressure (EP) properties and the like and their incorporation into a grease by the above described method provide such beneficial properties to the grease.

DISCUSSION OF THE PRIOR ART

It is very desirable in the preparation of an additive composition e.g. a grease additive composition to incorporate in the composition certain compounds which are water soluble and possess anticorrosive properties. An example of this is sodium nitrite which provides corrosion inhibition. In addition to this, it is desirable to employ in some grease compositions, depending upon their end use, extreme pressure (EP) additives, These include notably sodium borate $Na_2B_4O_7$. In addition to these compounds it will be realized that other corrosion inhibiting compounds or extreme pressure additives may be desired for incorporation in a grease composition as a finely divided dispersion, such as boric acid. To pass visual inspection, the particles of the dispersed water soluble compounds should have a size below 5 microns although particles up to 10 microns in some cases are permissible. It will be realized that particles larger than 60 microns, particularly those above 100 microns, especially in the case of greases containing dispersed sodium nitrite are unacceptable for use from the standpoint of appearance. In addition to this, additive compositions containing compounds which have a substantial degree of hardness and a large particle size can impart to surfaces being lubricated an undue amount of abrasion. Hence, it is very desirable to provide an additive composition wherein the dispersed water soluble compounds are present in the composition as very small particles especially below 10 microns in size. It would be especially desirable to provide these particles in a size less than 5 microns from an appearance, abrasion, wear and noise point of view.

With this problem in mind, it has been proposed to prepare stable dispersion of sodium nitrite to be used as grease additives by dry grinding the salt in suitable grinding equipment so that the particle size is below 60 microns and then incorporating the so-ground inorganic compound in the grease composition. However, dry grinding of the sodium nitrite is costly as it necessitates the purchase of suitable costly grinding equipment and additional vessels for the operation and, in some cases, can be a hazardous operation. Furthermore, in some cases when a commerical quantity of grease is prepared, say at least 400 lbs., the particle size tends to be non-uniform and include particles of the dispersed water soluble inorganic compound of at least 100 microns in size.

In the storage of a grease additive containing a finely-divided water-soluble inorganic salt of particle size greater than 1 micron, the suspended particles often settle leaving a portion of the oleaginous medium as a separate layer. This settling is undesirable since it results in clumping of the finely-divided water-soluble salt which in turn results in a grainy appearance when incorporated into a grease and possible abrasion from the oversized clumps. Furthermore, this settled condition of the dispersion after storage necessitates considerable mechanical mixing before it can be incorporated into a grease, a process which is time consuming and costly. Heretofore, it has been the practice to attempt to prevent such settling by the incorporation of a minor amount of a finely divided inorganic material having particles in the range of 0.01 to 0.2 micron, e.g., a finely divided silica or finely divided calcium carbonate. Although use of such materials does provide short term protection against particle clumping, gross settling of the suspended particles resulting in separation of the oleaginous medium and requiring mechanical mixing of the stored slurry before use may occur with longer storage periods, e.g., over 3 months.

OBJECTS OF THE INVENTION

It is an object of this invention, therefore, to provide a process for preparing stable dispersions of water soluble compounds in an oleaginous medium, said dispersion to be eventually incorporated into a grease composition to give some beneficial property, e.g., EP property, corrosion inhibition, or elevated dropping point to the grease.

It is another object of this invention, therefore, to provide a simple and efficient method for dispersing water soluble inorganic compounds in the oleaginous medium wherein the inorganic compounds are present in an average particle size of less than 5 microns with the majority of the particles in the range 1–3.5 microns.

It is another object of this invention, therefore, to provide a process for preparing the aforesaid dispersion of inorganic compound in an oleaginous medium which can be preformed without employment of expensive mixing equipment, e.g., colloid mill or homogenizer, and which does not entail separate operation from mixing equipment (e.g., centrifugal or gear pump) and vessels normally used in grease or chemical plant operation.

It is another object of this invention, therefore, to employ as an emulsifying agent a material which has value in stabilizing the finished dispersion by forming a stable gel with the oleaginous medium thus preventing any separation of the oleaginous medium from the suspension of water-soluble inorganic particle.

It is another object of this invention, therefore, to provide a dispersion suitable for incorporation into a grease (without the necessity of mechanical mixing of the dispersion beforehand) by direct addition of the dispersion (additive composition) preferably to the grease as part of the grease making process.

STATEMENT OF THE INVENTION

Broadly, this invention contemplates a process for preparing a suspension of particles of a water soluble solid in an oleaginous medium, in which an aqueous solution of the solid is emulsified with an oleaginous liquid to form a water in oil emulsion and the emulsion is thereafter dehydrated as by heating to a temperature in the range of about 250° F.–350° F., the emulsification and dehydration both being carried out in the presence of an emulsifiable polyethylene, say in an amount 0.2–1.0% by weight of the oleaginous liquid.

In a particularly desirable embodiment, this invention contemplates a process for preparing a stable dispersion of a water soluble inorganic compound in an additive composition which comprises the steps of:

(1) Forming a mixture of lubricating oil and an emulsifiable polyethylene;

(2) Heating the mixture of lubricating oil and emulsifiable polyethylene to a temperature above the melting point of the emulsifiable polyethylene and adding the amount of base required to neutralize the emulsifiable polyethylene;

(3) Introducing to said mixture a water soluble inorganic compound and shearing the resultant mixture; and (4) Heating the mixture to a temperature sufficient to dehydrate the mixture and cooling.

In a particularly desirable embodiment, this invention contemplates a process for forming a stable dispersion of a water soluble inorganic compound in a lubricating grease additive composition which comprises the steps of:

(1) Forming a mixture of mineral oil and emulsifiable polyethylene;

(2) Heating the mixture of mineral oil and emulsifiable polyethylene to a temperature sufficient to melt the emulsifiable polyethylene while adding the amount of alkali required to neutralize the emulsifiable polyethylene;

(3) Introducing into the mixture of mineral oil and emulsifiable polyethylene an aqueous solution of a water soluble inorganic compound while withdrawing a minor portion of the so-formed mixture and recirculating it through a recirculation line equipped with a shear valve to shear the mixture.

(4) Heating the mixture to a temperature sufficient to dehydrate the same; and (5) Cooling the so-formed oleaginous suspension.

Due to the gellation of the finished dispersion by the emulsifiable polyethylene, addition of small amount of finely divided silica to prevent settling of the dispersed water soluble inorganic compound in the grease additive composition as taught in the art is optional.

In a still more preferred embodiment of our invention, sodium nitrite is incorporated as a stable dispersion in a grease additive composition by employing an emulsifiable polyethylene having a softening point of about 225° F., a hardness of 1.5, an acid number of 16 and consisting of polyethylene having a low molecular weight. The composition has a melting point at about 230° F. Such an emulsifiable polyethylene is marketed by Allied Chemical Corporation under the trademark A–C 680. The sodium nitrite is dispersed in the grease additive composition by heating the mixture of lubricating oil e.g. mineral oil and emulsifiable polyethylene to 230° F. to thereby melt the polyethylene and the composition is cooled to about 200 to 210° F. at which time a small amount of sodium hydroxide, say 49% by weight sodium hydroxide aqueous solution, is added to neutralize the emulsifiable polyethylene. Thereafter, to the mixture of lubricating oil and emulsifiable polyethylene contained in, say, a kettle, there is added sodium nitrite. A sodium nitrite solution is prepared in situ during the preparation of the additive composition with the water added with the sodium hydroxide thus eliminating use of a separate vessel. In this case, the resultant mixture requires a high degree of agitation. Alternatively, and more preferably a pre-prepared solution from a vessel containing a mixer plus a heating system to attain a solution temperature of 180–210° F. can be employed. The aqueous sodium nitrite solution is slowly added in that case to form a stable emulsion while the kettle contents are sheared. The kettle contents are thereafter heated to about 325° F. to evaporate the water and thereby form a slurry of finely precipitated sodium nitrite in oil. Thereafter the slurry is cooled and, if desired, a small quantity of finely divided silica is added to prevent settling of any sodium nitrite during excessive storage of the slurry. The slurry is then drawn and packaged in the usual fashion.

Without limiting the scope of the invention and in order to set forth another even more preferred mode of operation, my process is performed by the following general steps:

(1) Forming a solution of a water-soluble compound in a vessel suitably equipped with a circulation line, and pump;

(2) Adding a mineral oil to said solution and mixing the resultant mixture;

(3) Adding emulsifiable polyethylene with any alkali necessary to neutralize said emulsifiable polyethylene to the mixture and heating the resultant mixture to a temperature sufficient to melt the polyethylene under conditions to maintain the water in the system e.g. by employing reflux or a closed vessel;

(4) increasing agitation as by recirculating, to form the emulsion, releasing any pressure, and then heating to dehydrate the emulsion to precipitate the water-soluble compound resulting in a dispersion of the water-soluble compound in mineral oil; and (5) cooling the resultant dispersion, adding finely divided silica, if desired, and packaging in the regular manner while the dispersion is still in liquid form and the temperature is in the range 200–250° F.

In a more preferred method the vessel is charged with water which is heated and to the heated water is added sodium nitrite. The mineral oil is added at a temperature of about 200° F. and the emulsifiable polyethylene is introduced thereto and the entire mixture is heated up to the melting point of the polyethylene under conditions to retain the water in the system. After the polyethylene is melted the mixture is dehydrated while being recirculated through an external recirculation line. When dehydrated, it is statically cooled forming an excellent gell of sodium nitrite dispersed in the oil medium.

To further illustrate the adaptability of the invention the following procedure which is suitable for use in an open vessel may be performed by the following general steps:

(1) Forming a mixture of lubricating oil and emulsifiable polyethylene in a grease kettle or other apparatus for making grease preferably equipped with a circulation line, pump and shear valve;

(2) Heating the lubricating oil and emulsifiable polyethylene to the melting point of the emulsifiable polyethylene and adding thereto a sufficient amount of alkali, if necessary, to neutralize the emulsifiable polyethylene;

(3) Circulating the mixture in the grease-containing apparatus through the external circulation line and adding thereto an aqueous solution of a water soluble inorganic compound. This aqueous solution can be suitably prepared in a separate vessel preferably containing some type of mixer with a heating system so that the temperature of the solution can be preferably raised to a temperature close to that of the mixture of lubricating oil and emulsifiable polyethylene;

(4) Heating the kettle contents to dehydrate the resulting additive composition and thereafter cooling the so formed composition. Although addition of a small amount of a stabilizing agent such as finely divided silica was taught in the art to prevent settling of any of the dispersed water soluble compound during storage, we have found the formation of a stable gel due to the presence of the emulsifiable polyethylene makes this step merely optional.

In large-scale production of the dispersion, manufacture is most convenient using a single kettle procedure. Without limiting the scope of the invention, one such procedure is presented as follows:

(1) 30 parts sodium nitrite and 30 parts water are charged to vessel and the resultant mixture is heated to 200° F. to effect solution of the sodium nitrite.

(2) 66.36 parts lubricating oil are added gradually to the sodium nitrite solution so as to maintain the temperature of the solution above 180° F. during the addition. Then 0.24 part 49% caustic solution are added, (3) Following addition of the lubricating oil, 3.5 parts AC-680 emulsifiable polyethylene are added and, the batch is heated to 230° F. (melting point of A.C. 680). During this period the batch is kept under pressure (vessel outlet is blocked) to prevent the evaporation of water in the region 212° F. —230° F. Water evaporation can also be prevented by use of a reflux column in this temperature range. Circulation by centrifugal pump is also started at 230° F. to aid in forming the emulsion.

(4) Following emulsification, gradually reopen vessel outlet and heat to 325° F. to dehydrate. Batch can be nitrogen blown during dehydration to aid in water removal.

(5) Following dehydration (reduction of water content to 0.3 wt. percent or less), batch is cooled to 225° F. (range 200-250° F.) and packaged in the usual manner.

(6) When batch is drawn while still in liquid form (preferred temperature 230° F.) the dispersion sets up to a gel structure which prevents any separation of the oleaginous medium from the sodium nitrite. If desired, a minor amount of finely divided silica can be added before the batch is drawn to aid in prevention of caking or clumping of the sodium nitrite particles although gellation of the finished dispersion due to the presence of the emulsifiable polyethylene makes this step optional.

In performing our invention emulsifiable polyethylene is employed. By the term "emulsifiable polyethylene" there is contemplated not only straight chain polyethylene polymers but branch chain polymers as well. In addition, copolymers of polyethylene and other polymerizable materials are contemplated. For instance, I contemplate employing copolymers of ethylene and organic acids such as terephthalic acid, either random or block copolymers. It will be apparent that other polyester forming monomers together with the ethylene unit can be employed in copolymeric form. However, it should be noted that the polymer must be capable of forming an emulsion in an oleaginous medium. Generally speaking, the emulsifiable polyethylenes utilizable in the process of the invention are those having a low molecular weight, say between 2000 and 3500 and many of which are considered synthetic waxes. They have relatively low melting points compared with polyethylenes useful for construction purposes and the like. They have relatively low viscosities and a hardness between 2 and 12. Suitable polyethylenes for use in the process of our invention are those sold by Allied Chemical Corporation under the trademark A-C with the following grade designations 629, 655, 656, 680 and 540. Grade designation 540 is a copolymer of ethylene and an organic acid.

The amount of water soluble inorganic compound in the finished dispersion will vary depending upon the specific inorganic compound used. For instance, employing the same amount of emulsifier, a suitable dispersion of 30 wt. percent sodium nitrite can be prepared whereas a dispersion of only 20 wt. percent sodium borate can be prepared. The amount of emulsifiable polyethylene employed is generally kept in the range of 3.0 to 4.0 percent although an increase in the amount of emulsifying agent employed results in some increase in the amount of water soluble inorganic solid which is employed in the process. However, the invention in the preferred form is most useful if the emulsifier is maintained at a low level in preparation of the dispersion in order that the emulsifying agent be only a very small percentage of the finished additive composition to which the dispersion is added. For instance, we have found that an additive composition containing 30% by weight of sodium nitrite can be prepared in accordance with our invention by employing 3.5 percent by weight of an emulsifiable polyethylene, based on the total weight of the finished dispersion. Hence, addition of this dispersion to a suitable grease so as to contain 1% by wt. of sodium nitrite in the finished grease composition entails the inclusion of only 0.12% by wt. of emulsifying agent. Of course in some instances in which the inclusion of emulsifier in the final grease composition would be beneficial, the amount of emulsifier included in the dispersion can be increased. The sodium nitrite added as a 1:1 aqueous solution is present in an average particle size substantially below 10 microns and especially below 5 microns as revealed by light and election micrographs and more especially in the range of 1-3.5 microns. Generally speaking the emulsifying agent can be present in the range of 0.25-20 percent by weight based on the total weight of the composition, and in the case of sodium nitrite the water soluble inorganic material can be present in the amount of between 1 and 60 percent by weight, the balance being substantially lubricating oil, say mineral oil in the range of 20-97 percent by weight.

The oleaginous medium used in the dispersion shall preferably correspond to the oil component of the grease to which the dispersion is to be added. Hence, for greases having a considerable quantity of synthetic oleaginous compounds, e.g., di-esters, polyesters, polyethers, silicones, etc., it is contemplated that these synthetic oleaginous compounds be used in preparation of the dispersion. Examples of suitable polyesters include the olefinic dicarboxylic acid diesters, such as di-2-ethylhexyl sebacate, di(secondary amyl) sebacate, di-2-ethylhexyl azelate, di-iso-octyl adipate, etc. However, a lubricating oil which is substantially unreactive under the conditions employed is preferably employed in the dispersion making mixture. Hence, if the emulsifiable polyethylene utilized contains a substantial quantity of acid groups that require neutralization with an alkali, e.g. sodium hydroxide, it is preferred that the lubricating oil employed be unreactive under the conditions. Lubricating oils employed for this purpose are very suitably mineral oils having viscosities of at least about 150 second Saybolt Universal at 100° F. which can be mixtures of lighter and heavier oils.

It will be realized that in the process of our invention the various temperatures will vary with the ingredients employed. For instance, in the preparation of the stable dispersion the emulsifiable polyethylene will vary in melting point and hence the temperature to which the mixture of lubricating oil and emulsifiable polyethylene are heated will vary. It should be realized that it is important that the emsifiable polyethylene be melted so that it will be in a receptive condition for emulsification with the aqueous solution of the water soluble compound. Concomitant with this is the temperature to which the aqueous solution of water soluble inorganic compounds is heated. It will be recalled that in a preferred two vessel process of our invention the aqueous solution is heated to a temperature about the melting point of the emulsifiable polyethylene so that no substantial shock cooling or the like occurs when the aqueous solution is introduced into the mixture of lubricating oil and emulsifiable polyethylene and also to form a sodium nitrite solution of near maximum concentration so as to minimize the amount of water to be evaporated during dehydration. Hence, these temperatures should correspond within about a 50 degree variation. In the dehydration step, following the addition of the mixing of the aqueous solution together with the lubricating oil and melted emulsifiable polyethylene the temperature will vary depending upon the specific emulsifiable polyethylene employed, the lubricating oil utilized and the proportions of the inorganic compound in the aqueous solution. Generally, however, it is required that the temperature of the grease additive composition be heated to substantially dehydrate the same. It is not desired that the grease additive composition be heated to a temperature substantially in excess of that required for dehydration as this can cause some degradation of the polyethylene polymer utilized without deriving any beneficial results from such a treatment. Generally, a temperature of say between 10 and 30° F. above the temperature required for dehydration is sufficient. Dehydration takes place generally for a period of time between 8 and 16 hours depending upon the amount of water to be removed and the heating and stirring rates of the equipment employed. While dehydration is important in the process of the instant invention removal of all of the water is not absolutely essential. As indicated by the table below small amounts of water can be tolerated in the additive composition of this invention because of the beneficial properties imported by the polyethylene and because of the manner in which the water soluble compound is dispersed in the composition. This provides a distinct advantage over prior art methods and compositions which have stressed the desirability and importance of reducing the water content, especially in the case of sodium nitrite to below 0.1 weight percent based on the weight of the sodium nitrite.

It is important but not essential in the process of our invention that the mixture of lubricating oil and emulsifiable polyethylene be mixed say by withdrawing a portion of the additive mixture from the kettle or the like through an external circulation line provided with a circulation pump with or without a shear valve in the line. When using a shear valve the mixture is passed through the valve which is operated with a pressure drop across the valve of between about 2 and 125 pounds per square inch. A degree of shearing provided by operation with a valve having a greater pressure drop provides some beneficial effects. However, substantial increment in benefit begins to taper off when pressure drops substantially greater than 125 lbs. per square inch are employed. Use of paddle stirrers in grease kettles or lightning mixers in a reservoir, on the other hand, generally have been found to provide inadequate mixing. However, vigorous stirring has resulted in the preparation of suitable slurries in laboratory glassware, e.g., 500–5,000 ml. 3-necked flasks. In general what is desired is good mixing to provide a homogeneous mass.

In order to more particularly point out the nature of our invention and the manner of practicing the same, the following examples are presented. In these examples there is set forth the best mode contemplated by me of carrying out my invention. Percentages of ingredients are on a weight basis unless otherwise stated.

Example I

Into a grease kettle equipped with recirculation line pump and shear valve was charged 67.6 parts of a solvent refined mineral oil having an SUS viscosity at 100° F. of 340 and at 210° F. of 54, API gravity 29.5, based on the total weight of the finished additive composition, together with 3.4 parts of a polyethylene copolymer having a softening point of 226° F., a hardness of 2, an acid number of 40, a specific gravity at 75° F. of 0.93, a viscosity at 284° F. of 560 and a cloud point of 175° F. The polymer was a copolymer of ethylene and an organic acid and marketed by Allied Chemical Corporation under the trademark A–C 540. The mixture of lubricating oil and emulsifiable polyethylene was heated to 230° F. to dissolve the copolymer and thereafter cooled to 200° F. During cooling, a minor stream of the mixture was withdrawn from the grease kettle via an external circulation line and recycled from the bottom to the top of the kettle via the circulation line which contained a shear valve operating with a pressure drop across the valve of 60 p.s.i. A small quantity of sodium hydroxide (49% aqueous solution) was added to neutralize the emulsifiable polyethylene. To the mixture of emulsifiable polyethylene and lubricating oil while being recirculated was added slowly an aqueous solution of sodium nitrite solution (10 parts sodium nitrite: 9 parts water). An amount of solution was added such that the final amount of sodium nitrite in the additive composition was 28.0 parts by weight. The mixture was heated to 300° F. and maintained at that temperature until all of the water was removed by dehydration. The so heated and dehydrated additive composition was cooled. The sodium nitrite in the grease additive was present in particle size substantially less than 10 microns with an average particle size of less than 5 microns.

Example II

In the manner of Example I, 57.0 parts of a mineral lubricating oil were charged into a grease kettle together with 3.4 parts of the same emulsifiable polyethylene employed in Example I, all parts being on the total weight of the finished additive composition. The mixture was heated to 230° F. to dissolve the copolymer and thence cooled to 200° F. at which time the circulation begun employing shear valve in the recirculation line being operated with a pressure drop across the valve of 60 p.s.i. A sufficient quantity of a 49% aqueous solution of sodium hydroxide was added slowly to neutralize the copolymer. An aqueous solution of sodium nitrite was added slowly while the mixture was recirculated such that the amount of sodium nitrite of the total finished additive was 28.5 parts by weight. The additive composition was thereafter heated to 300° F. to dehydrate the batch. When dehydration was substantially complete, the additive composition was cooled during which 0.9 part of finely divided silica was added. The additive composition obtained contained 28.5 weight percent sodium nitrite present in a particle size below 10 microns as revealed by examination employing light micrographs of 125 times magnification. The composition was stabilized against removal of the mineral oil from the sodium nitrite by the addition of the finely divided silica.

Example III

Employing the same apparatus as employed in Examples I and II and a mineral oil having a SUS viscosity of 210° F. of 54, there was charged into the grease kettle 65.5 weight percent mineral oil together with a low molecular weight polyethylene marketed under the trademark A–C 656 by Allied Chemical Corporation. The low molecular weight polyethylene has the following properties: a softening point of 205° F., a hardness of 12, an acid number of 15, a specific gravity at 75° F. of 0.92 and at 248° F. of 0.80, a viscosity at 284° F. of 120 and at 248° F. of 300. The amount of low molecular weight polyethylene employed was 3.5 weight percent based on the weight of the finished additive composition. Employing the method of Examples I and II, the mixture of mineral oil and polymer was heated to a temperature of about 230° F. to dissolve the polymer in the oil and thereby render the mixture receptive for the stable dispersion of sodium nitrite therein. To the mixture was added a small quantity, 0.2 weight percent based on the finished additive, of sodium hydroxide to neutralize the polymer. To the so heated mixture of lubricating oil, polymer and sodium hydroxide was added an aqueous solution of sodium nitrite (10 parts sodium nitrite, 9 parts water) such that the total amount of sodium nitrite in the finished additive composition was 30.0 weight percent. While the sodium nitrite solution was added to the mineral oil mixture, a minor stream of the mixture was withdrawn from the grease kettle and passed through a recirculation line equipped with a pump and shear valve operated with a pressure drop across a valve of 60 p.s.i. After the total amount of sodium nitrite was added to the mineral oil mixture, the entire mixture was heated to a temperature of about 325° F. to dehydrate the mixture. After dehydration was substantially complete, the mixture was cooled during which a small quantity of finely divided silica was added to insure stable dispersion of the sodium nitrite in the additive composition. The amount of finely divided silica was 0.8 weight percent based on the total weight of the finished composition. The finished additive composition was examined to determine how the sodium nitrite was present in the additive composition. Light micrographs of the composition revealed that the sodium nitrite was dispersed therein in particle size of about 5 microns. It also showed that the particles were present as uniformly sized spherical particles and tended to be grouped into clusters consisting of several particles by electron micrographs of 8,000 magnification.

Example IV

Employing the same type of equipment employed in the above examples and utilizing the same procedure except that the batch was dehydrated for 22 hours at 300° F. before addition of finely divided silica during the cooling operation, an additive composition having the below percentages of ingredients was prepared:

| | |
|---|---|
| A–C 680 | 3.5 |
| Sodium nitrite | 30.0 |
| Mineral oil SUS at 210° F. of 54 | 65.5 |
| NaOH | 0.2 |
| Finely divided silica | 0.8 |

A–C 680 is a low molecular weight polyethylene polymer having emulsifying properties. It has a softening point of 229° F., a hardness of 1.5, an acid number of 16, a specific gravity of 0.94 at 75° F. and 0.81 at 248° F., a viscosity at 284° F. at 160 and 248° F. of 300. The additive composition so-prepared was examined under light micrograph and revealed the presence of sodium nitrite in particle size well below 10 microns and an average particle size below 5 microns.

Example V

To a vessel equipped with stirrer plus a pump and line for external circulation through a shear valve mineral lubricating oil utilized in the above examples is charged in an amount of about 77% by weight and A–C 540 is added as the temperature of the lubricating oil is heated to about 230° F. The A–C 540 is present in amount about 3%, based on the weight of the finished dispersion composition. The mixture of lubricating oil and copolymer is then cooled to about 200° F. Sodium hydroxide in the form of a 49% by weight aqueous solution is added in the amount of 0.17% by weight, based on the finished dispersion composition, to neutralize the polyethylene-organic acid copolymer. The circulation of the contents of the grease kettle is begun through the partially closed shear valve operating with a pressure drop across the valve of about 40 p.s.i.g. Stirring of the contents of the mixture and circulation and shearing is continued. While the kettle contents are being recirculated and sheared and the temperature is in the range of about 180–210° F., an aqueous solution of completely dissolved sodium borate in amount of about 2.5 parts water to 1.0 part by weight sodium borate is added over a period of about 30 minutes to form a stable emulsion of the sodium borate in the oil. The sodium borate is added such that it is present in the finished dispersion in an amount of about 20% by weight. After all of the aqueous sodium borate solution is added, the emulsion is heated to a temperature of between about 300–325° F. to dehydrate the emulsion. The dehydration temperature is maintained within this range for about two hours to insure substantially complete dehydration. The dispersion is then cooled to safe handling temperature of 200° F. and drawn from the kettle. The dispersion contains sodium borate in finely divided form, the particles being present in a size below 5 microns. The sodium borate is uniformly dispersed in the lubricating oil. Addition of the dispersion to a grease provides a grease composition having a substantially large amount of extreme pressure (EP) additive which passes the visual inspection as well as serving to lubricate bearings and the like with a minimum of noise and abrasion.

Examples VI–XII

A grease concentrate containing sodium nitrite dispersed in an average particle size below ten microns was prepared by charging into a grease kettle based on the total weight of the finished grease concentrate, 65.36 parts by weight of a paraffin based distillate oil which has been furfural refined, light acid treated, clay contact filtered, solvent dewaxed and deodorized by vacuum steam stripping, the oil having SUS viscosity at 100° F. of between 325 and 350 and an SUS viscosity at 210° F. of between 53 and 55. Together with the lubricating oil, there was charged 3.5 parts by weight A–C polyethylene 680 marketed by Allied Chemical Corporation. The mixture of mineral oil and low molecular weight polymer was heated to a temperature of about 230° F. to dissolve the polymer in the oil and thereby render the mixture receptive for the stable dispersion of sodium nitrite therein and also to prepare the mixture for the stabilizing properties imparted to the mixture by the polyethylene. To the mixture was added a small quantity, 0.14 parts, of sodium hydroxide to neutralize the polymer. To the so heated mixture of lubricating oil, polymer and sodium hydroxide was added an aqueous solution of sodium nitrite (10 parts sodium nitrite, 9 parts water) such that the total amount of sodium nitrite in the finished additive concentrate was 30.0 weight percent. While the sodium nitrite solution was added to the mineral oil mixture, a minor stream of the mixture was withdrawn from the grease kettle and passed through a recirculation line equipped with a pump and shear valve operated with a pressure drop across the valve of about 60 p.s.i. After the total amount of sodium nitrite was added to the mineral oil, the entire mixture was heated to a temperature of about 325° F. to dehydrate the mixture. After dehydration was complete, about two hours of heating, the mixture was cooled during which a small quantity of finely divided silica, 1.0 part by weight, was added to insure stable dispersion of the sodium nitrite in the grease composition. The finished additive composition was examined to determine the state of the sodium nitrite present in the grease concentrate. Examinations shown that there was no gritty sodium nitrite sediment present in the additive cencentrate. Examination also revealed that the polyethylene formed an emulsion which held the sodium nitrite in the grease concentrate uniformly. The sodium nitrite was found to be present in a maximum particle size of less than ten microns and generally uniformly dispersed through the additive concentrate.

In order to demonstrate the effect of water on the grease concentrates containing the rust inhibitor sodium nitrite and also to demonstrate the remarkable stabilizing effect of the emulsifiable polyethylene the following additive compositions were prepared. These are compared in the example below.

(A) 140 parts of the grease concentrate prepared by the example VII were heated to 325° F. and held at that temperature for two hours to insure that all of the water was removed therefrom. The batch was cooled to approximately 205° F. and 60 parts were removed and labeled. The additive concentrate prepared is identified below as concentrate A.

(B) A portion of the sample prepared in accordance with the A procedure was placed in a vessel and sufficient water was added to it to bring the water content of the batch in the kettle to 0.1 weight percent. The mixture was circulaed through an external circulation line and returned to the vessel for a period of 20 minutes. Ten pounds of additive concentrate containing 0.1 weight percent water were removed and that concentrate is designated as concentrate B. The temperature was held in the range of 200–210° F. during this step.

(C–E) The preparation of the additive concentrate B was repeated as water content of dispersion in the grease kettle was increased to 0.3, 0.5 and 1 percent by weight. These additive concentrates are designated grease concentrates C. D and E respectively.

(F) An additive concentrate was prepared by charging into a grease kettle equipped with an external recirculation line and shear valve 30 parts by weight sodium nitrite and 30 parts water which were heated to 200° F.

To the so heated aqueous solution was charged 65.36 parts by weight of the same paraffin base distillate oil used in the above example which was furfural refined, light acid treated, clay contact filtered, solvent dewaxed and deodorized by vacuum stripping. Together with the lubricating oil there was charged 0.28 part by weight of a 49 percent by weight caustic solution and the mixture was heated to 230° F. The mixture was refluxed to prevent dehydration of the batch at this point. To the heated mixture was added 3.5 parts by weight of A–C polyethylene 680 and recirculation through the external recirculation line was begun. The mixture was held for a period to insure emulsion formation. Any pressure was released and the batch was heated to 325° F. to dehydrate the batch and held at this temperature for a sufficient time, about 2 hours, to insure dehydration. The batch was cooled to 250° F. and a portion was removed. This portion is designated below as additive concentrate F.

To compare these additive concentrates a concentrate prepared by art suggested methods was prepared. It was prepared by charging 30 parts by weight sodium nitrite, 69 parts of the same mineral lubricating oil utilized in preparing concentrates A through F, and one part by weight of finely divided silica to a ball mill and the resultant mixture was milled for 24 hours until particle sizes of the sodium nitrite were in the range of 5–40 microns. This grease concentrate is designated X.

A comparison of the grease concentrates designated by the letters A through F with concentrate X and with one another is shown in the below table.

compound e.g. sodium nitrite. In so doing only one vessel is necessary as the vessel used in preparing the aqueous solution is dispensed with. The following is a preferred mode of utilizing the single vessel technique.

Example XIII

To a vessel equipped with a stirrer and reflux was charged the same mineral oil utilized in Example I together with A–C polyethylene 680 mixing commenced. The polyethylene was present in an amount based upon the finished product of about 3.5 weight percent of the mineral oil was in an amount also based on the finished product of about 65.5 weight percent. The addition took about 1 hour and the vessel was maintained at ambient temperature. After the addition was complete, the mixture was heated for one hour and the temperature rose to about 230° F. at which point dilute caustic solution was added over a period of ½ hour. During this period of time, the temperature varied between 230–210° F. The amount of water was sufficient to solubilize the subsequently added sodium nitrite in situ. About 30.0 weight percent sodium nitrite was thereafter added over a period of about 1 hour with the temperature in the range of 200–210° F. After one hour the temperature was increased to dehydrate the additive composition. The dehydration took between about 1.5 hours and the temperature varied up to 325° F. The temperature was held at 325° F. for 2 hours after which it was permitted to cool down to 250° F. over a period of between 1 and 2 hours. At 250° F. a minor quantity about 1.0 weight percent

TABLE I

| | Grease Concentrate | | | | | | |
|---|---|---|---|---|---|---|---|
| | A | B | C | D | E | F | X |
| Composition, wt. percent: | | | | | | | |
| Sodium nitrite | 30.0 | 30.0 | 30.0 | 30.0 | 30.0 | 30.0 | 30.0 |
| Mineral oil | 65.36 | 65.26 | 65.06 | 64.86 | 64.36 | 66.36 | 69.0 |
| Cab-O-Sil [1] | 1.0 | 1.0 | 1.0 | 1.0 | 1.0 | | 1.0 |
| AC-680 [2] | 3.50 | 3.5 | 3.5 | 3.5 | 3.5 | 3.50 | |
| Sodium hydroxide | 0.14 | 0.14 | 0.14 | 0.14 | 0.14 | 0.14 | |
| $H_2O$ | | 0.10 | 0.30 | 0.50 | 1.0 | | |
| Tests: | | | | | | | |
| Penetration undisturbed ASTM D-217 | 192 | 204 | 224 | 183 | 246 | 208 | 429+ |
| Oil separation, percent,[3] 10 days storage | 0 | 0 | 0 | 0 | 0 | 0 | 29 |

[1] Finely divided silica of Cabot Corporation.
[2] Emulsifiable polyethylene of Allied Chemical Corporation.
[3] Calculated by percent Oil Separation = $\frac{\text{Height of Separated Oil Phase}}{\text{Original Height of Dispersion}}$ It should be noticed that from the above table that water has significantly little effect on the oil separation in greases provided with the low molecular weight emulsifiable polyethylene in accordance with the instant invention. Note that the additive X not containing any low molecular weight polyethylene shows significant oil separation after ten days storage. It should also be noticed that one can tolerate up to at least 1.0 weight percent water in the grease composition without any deleterious properties insofar as oil separation is concerned. Also of significant interest as revealed by the comparative data in Table I is the stabilizing effect of the low molecular weight emulsifiable polyethylene which does not contain any finely divided silica. It should be noticed that the composition that contains low molecular weight polyethylene but not any finely divided silica, additive concentrate F, does not show any oil separation after ten days storage whereas an additive composition X containing silica but not any low molecular weight emulsifiable polyethylene shows 29 percent by weight oil separation after only ten days storage. Also, the additive composition has remarkably high penetration as determined by ASTM D-217.

The above examples principally relate to a two-vessel technique for preparing the additive composition according to this invention. By altering the steps, the process can be performed using only one reactor and forming the solution of the water soluble compound in situ i.e. within the vessel employed for the additive composition preparation. This is done by adding sufficient water with the caustic to solubilize the subsequently added water soluble (based on the final product) of finely divided silica was added. Cooling continued for about one hour down to a temperature of about 200° F. at which temperature it was withdrawn. The resultant additive composition contained the sodium nitrite dispersed therein in an average particle size well below 5 microns.

The above procedures are set forth to illustrate the nature of the invention and the best modes contemplated for carrying out the invention. It will be realized that various modifications of the overall procedure are possible. For instance, the overall procedure can be varied so as to circulate the mixture of added water soluble inorganic compound, emulsifiable polyethylene and lubricating oil after the aqueous solution of inorganic compound has been added to the mixture without any back pressure in the circulation line employed thus insuring mixing without the necessity of employing a stirrer or other type of mixing.

It will be realized that the process of this invention does not require the employment of water gelling agents or water softening agents to aid in dispersion of the sodium nitrite. It is believed that the simple procedure of raising the temperature of the mixture of lubricating oil and polyethylene sufficient to melt the polyethylene provides an environment conducive for preparation of a dispersion of the inorganic compound therein in a very small particle size, say 5 microns. The use of polyethylene not only provides a very effective emulsifying agent in formation of the dispersion but also acts as a gelling agent in the finished dispersion. Generally speaking, the emulsifiable polyethylene can be employed in a finished dispersion composition from 0.25 to 20%, the water soluble inorganic compound between 1 and 60 percent by weight, the balance being lubricating oil, preferably mineral lubricating oil. Use of a ratio of inorganic compound to emulsifiable polyethylene in excess of 9:1 by weight may result in severe clumping and separation of the inorganic compound from the oil. The preferred composition of the dispersion as prepared by the process of this invention contains the ingredients in the following weight percent: emulsifiable polyethylene 2–5 percent, inorganic compound 20–40%, lubricating oil 78–55 percent.

In addition to the above specifically illustrated inorganic compound which can be dispersed in the manner of our invention in an oleaginous medium, it will be realized that other substances can be dispersed in the same manner provided they can be added in the form of an aqueous solution. These additives include all those heretofore known for incorporation in greases and oleaginous additive compositions in general. Several notable examples for inclusion in an additive composition according to my invention include mono, di or tri sodium phosphate, calcium acetate, alkali or alkali metal salts of organic acids or sulfonic acids, alkali metal or alkaline earth halides, sodium carbonate and alkyl amine salts. It will be realized that the grease to which the additive composition is added can be soap thickened, salt thickened, salt-soap thickened or any combination or mixtures thereof, as the essence of this invention revolves about method by which the water insoluble compound can be dispersed in an oleaginous medium in a finely divided form wherein the particle size is substantially below 10 microns, especially in the range of 1–3.5 microns. This dispersion can then be added to a grease to result in a finished grease composition in which the finely divided material of the dispersion has been incorporated.

It is to be realized that while the above disclosure speaks of including the additive composition in a grease for rust inhibition etc., its use is not limited thereto. Its use depends upon the specific water soluble compound added. The oleaginous composition can be used in a variety of compositions e.g. lubricants and protective coatings and the like where the property imparted by the water soluble compound is desired.

The terms and expressions which have been employed are used as terms of description and not of limitation, as there is no intention, in the use of such terms and expressions, of excluding any equivalents of the features shown and described, or portions thereof, but it is recognized that various modifications are possible within the scope of the invention claimed.

What is claimed is:

1. A process of preparing a suspension of a water soluble compound having a particle size of less than about 10 microns in an oleaginous medium which comprises with an emulsifiable polyethylene selected from the group consisting of straight chain polyethylene, branched chain polyethylene, and copolymers of ethylene and terephthalic acid and having a molecular weight in the range of from about 2000 to about 3500 and a hardness value in the range of between 1.5 and 12 as the emulsifying agent heating and forming a water in oil emulsion from an aqueous solution of said compound and said oleaginous medium, and additionally heating the emulsion to dehydrate and form said suspension.

2. A process according to claim 1 which comprises the steps of:
(A) forming a mixture of lubricating oil and an emulsifiable polyethylene;
(B) heating the mixture of lubricating oil and emulsifiable polyethylene to a temperature above the melting point of the emulsifiable polyethylene and adding any amount of alkali required to neutralize the emulsifiable polyethylene;
(C) introducing to said mixture an aqueous solution of a water soluble compound and shearing the resultant mixture; and
(D) heating the mixture to a temperature sufficient to dehydrate the mixture and cooling the mixture.

3. A process for preparing a stable dispersion of water soluble inorganic compound according to claim 2 wherein said lubricating oil is mineral oil, wherein the aqueous solution of the water soluble inorganic compound is introduced into the mixture of mineral oil and emulsifiable polyethylene while a minor portion of the so formed mixture is withdrawn and recirculated through a recirculation line equipped with a shear valve to shear the mixture.

4. A process according to claim 3 wherein finely divided silica is added to the mixture during cooling after dehydration.

5. A process for preparing a stable dispersion of a water soluble inorganic compound as a grease additive dispersion composition according to claim 3 wherein the water soluble inorganic compound is sodium nitrite and the emulsifiable polyethylene has a softening point of about 225° F., a hardness of 1.5, an acid number of 16, the mixture of polyethylene and mineral oil is heated to 230° F. to melt the polyethylene, the composition is cooled to 200 to 210° F. and is neutralized with an aqueous solution of sodium hydroxide, and sodium nitrite is added as an aqueous solution at a temperature of 180–210° F.

6. A process according to claim 3 wherein the emulsifiable polyethylene is introduced such that the amount of emulsifiable polyethylene in the dispersion composition is in the range of 0.25–20% by weight, the sodium nitrite is introduced such that it is present in an amount in the dispersion composition of between 1 and 50% by weight, the balance of the dispersion composition being substantially lubricating oil in the range of 20–97% by weight.

7. A process according to claim 6 wherein the emulsifiable polyethylene is in the range of 2–5% by weight, the sodium nitrite is in the range of 20–40% by weight, and the lubricating oil is in the range of 78–55% by weight.

8. A process according to claim 1 wherein the water soluble compound is an extreme pressure additive.

9. A process according to claim 8 wherein said extreme pressure additive is sodium borate.

10. A process according to claim 1 which comprises the steps of:
(A) forming a solution of a water soluble compound in water;
(B) introducing to said solution an oleaginous medium and stirring the resultant mixture;
(C) adding an emulsifiable polyethylene with sufficient alkali for neutralization of said emulsifiable polyethylene to said mixture while heating said mixture under conditions to maintain said water in the system to about the melting point of the emulsifiable polyethylene; dehydrating the mixture with increased agitation and cooling the dehydrated mixture.

11. A process for preparing a stable dispersion of a water soluble inorganic compound in an oleaginous medium according to claim 10 wherein said compound is sodium nitrite, wherein said oleaginous medium is mineral oil and said mineral oil is introduced to a concentrated aqueous soluton of sodium nitrite, and a minor portion of mixture of oil, sodium nitrite, water and polyethylene is withdrawn and recirculated through a recirculation line when the temperature of said heated mixture reaches the melt point of the emulsifiable polyethylene.

12. A process according to claim 11 wherein said sodium nitrite solution is formed by charging into the vessel water and adding sodium nitrite thereto and heating the mixture to dissolve said sodium nitrite in said water.

13. A process according to claim 11 wherein finely divided silica is added during the cooling step.

14. A process for preparing a stable dispersion of a water soluble inorganic compound in an oleaginous medium according to claim 11 wherein the water soluble inorganic compound is sodium nitrite, the emulsifiable polyethylene has a softening point of about 225° F., a hardness of 1.5, an acid number of 16, and is added to the mixture of the oleagionus medium and the sodium nitrite solution at a temperature of about 230° F. and sufficient to melt said emulsifiable polyethylene while maintaining the water in said mixture at this temperature.

15. A process according to claim 11 wherein the emulsifiable polyethylene is introduced such that the amount of emulsifiable polyethylene in the finished oleaginous medium is in the range of 0.25–20% by weight, the sodium nitrite is introduced such that it is present in an amount in the finished oleaginous medium of between 1 and 50% by wt., the balance of the finished oleaginous medium being substantially mineral oil in the range of 20–97% by weight.

16. A process according to claim 15 wherein the emulsifiable polyethylene is in the range of 2–5% by weight, and the mineral oil is in the range of 78–55% by weight.

17. A dispersion composition comprising lubricating oil, an emulsifiable polyethylene selected from the group consisting of straight chain polyethylene, branched chain polyethylene, and copolymers of ethylene and terephthalic acid and having a molecular weight in the range of from about 2000 to about 3500 and a hardness value in the range of between 1.5 and 12 and a water soluble inorganic compound, said water soluble inorganic compound being present as a dispersion in said composition in a particle size less than 10 minutes.

18. A dispersion composition according to claim 17 wherein the water soluble inorganic compound is sodium nitrite and is present in an average particle size of about 1–3.5 microns, the emulsifiable polyethylene is present in an amount between 0.25 and 20 percent by weight, the sodium nitrite is present in an amount of between 1 and 50% by weight, the lubricating oil is mineral oil and is present in an amount between 30 and 97 percent by weight.

19. A dispersion composition according to claim 18 wherein the emulsifiable polyethylene is in the range of 2 to 5 percent by weight, the sodium nitrite is in the range of 20 to 40 percent by weight and the lubricating oil is in the range of between 78 and 55 percent by weight.

20. A dispersion composition according to claim 17 in which the water soluble inorganic compound is sodium borate.

21. A lubricating grease additive composition consisting essentially of mineral oil, an emulsifiable polyethylene selected from the group consisting of straight chain polyethylene, branched chain polyethylene, and copolymers of ethylene and terephthalic acid and having a molecular weight in the range of from about 2000 to about 3500 and a hardness value in the range of between 1.5 and 12 and a water soluble inorganic compound, said water soluble inorganic compound present in said lubricating grease additive composition in an average particle size less than 10 microns.

22. A process for preparing a dispersion of a water soluble compound in an oleaginous medium which comprises the steps of:
(A) forming a solution of water soluble compound in a vessel;
(B) adding mineral oil to said solution and mixing the resultant mixture;
(C) adding emulsifiable polyethylene selected from the group consisting of straight chain polyethylene, branched chain polyethylene, and copolymers of ethylene and terephthalic acid and having a molecular weight in the range of from about 2000 to about 3500 and a hardness value in the range of between 1.5 and 12 to the mixture with any alkali necessary to neutralize said emulsifiable polyethylene and heating the resultant mixture to a temperature sufficient to melt the polyethylene under conditions to maintain the water in the system;
(D) agitating the heated mixture to form a water in oil emulsion, releasing any pressure, and additionally heating to effect dehydration of the emulsion and to precipitate said water soluble compound as a dispersion in said mineral oil; and
(E) cooling the resulting dispersion.

23. A process according to claim 22 wherein the mineral oil is added at a temperature of about 200° F. and the emulsifiable polyethylene is introduced at said temperature, the entire mixture is heated up the melting point of the polyethylene under conditions effective to retain water, and dehydrating the mixture by circulation through a recycle line, and statically cooling the resulting dehydrated dispersion.

24. A process according to claim 22 wherein the water soluble compound is sodium nitrite.

25. A process according to claim 22 wherein the water soluble compound is sodium borate.

26. A process according to claim 22 wherein finely divided silica is added to the resulting dispersion during cooling.

References Cited

UNITED STATES PATENTS

| | | | |
|---|---|---|---|
| 2,980,612 | 4/1961 | Potter | 252—25 |
| 3,175,972 | 3/1965 | Mitacek et al. | 252—59 |
| 3,244,628 | 4/1966 | Hencke et al. | 252—39 |
| 3,259,577 | 7/1966 | Coant et al. | 252—18 |
| 3,269,943 | 8/1966 | Armstrong et al. | 252—59 |
| 3,313,727 | 4/1967 | Peeler | 252—25 |
| 3,321,399 | 5/1967 | Versteeg et al. | 252—18 |
| 3,340,206 | 9/1967 | Morway et al. | 252—18 |

DANIEL E. WYMAN, Primary Examiner

I. VAUGHN, Assistant Examiner

U.S. Cl. X.R.

252—18, 25, 59, 351, 354

PO-1050
(5/69)

UNITED STATES PATENT OFFICE
CERTIFICATE OF CORRECTION

Patent No. 3,488,721    Dated January 6, 1970

Inventor(s) Richard L. Frye

It is certified that error appears in the above-identified patent and that said Letters Patent are hereby corrected as shown below:

COLUMN 2, line 25, before "OBJECTS OF THE INVENTION" insert --SUMMARY OF THE INVENTION--; line 42, "preformed" should be --performed--. COLUMN 10, line 44, "through" should be --throughout--; line 71, "C." should be --C,--. COLUMN 15, Claim 17, line 34, "minutes" should read --microns--.

SIGNED AND
SEALED
OCT 20 1970

(SEAL)
Attest:

Edward M. Fletcher, Jr.
Attesting Officer

WILLIAM E. SCHUYLER, JR.
Commissioner of Patents